(12) United States Patent
Chen

(10) Patent No.: US 8,119,272 B2
(45) Date of Patent: Feb. 21, 2012

(54) BATTERY CONNECTOR AND HOLDING STRUCTURE FOR BATTERY

(75) Inventor: Ching-Wen Chen, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 55 days.

(21) Appl. No.: 12/634,797

(22) Filed: Dec. 10, 2009

(65) Prior Publication Data

US 2010/0233522 A1  Sep. 16, 2010

(30) Foreign Application Priority Data

Mar. 10, 2009  (CN) .......................... 2009 1 0300768

(51) Int. Cl.
*H01M 2/10* (2006.01)
*H01R 4/50* (2006.01)
(52) U.S. Cl. ........................ 429/100; 439/772
(58) Field of Classification Search .................. 429/122, 429/163, 160, 164; 439/500, 862
See application file for complete search history.

(56) References Cited

U.S. PATENT DOCUMENTS 7,575,469 B1 * 8/2009 Hung ............................ 439/500
2002/0064973 A1 * 5/2002 Nakamura et al. ................ 439/1

FOREIGN PATENT DOCUMENTS

CN  1949603 A  4/2007

* cited by examiner

*Primary Examiner* — Cynthia H. Kelly
*Assistant Examiner* — Monique Wills
(74) *Attorney, Agent, or Firm* — Altis Law Group, Inc.

(57) ABSTRACT

A battery connector for a portable electronic device comprises a seat body and a plurality of elastic pins, the seat body includes a first plate and a second plate perpendicularly formed a side of the first plate, the first plate and the second plate cooperatively enclosing a plurality of assembly grooves to assemble the elastic pins. Each elastic pin includes a first folding portion and a second folding portion connecting with the first folding portion. The elastic pins are assembled in the assembly grooves accordingly, the first folding portion protrudes from the first plate and the second folding portion protrudes laterally from the second plate. It is also provides a holding structure applying the battery connector.

9 Claims, 4 Drawing Sheets

BATTERY CONNECTOR AND HOLDING STRUCTURE FOR BATTERY

BACKGROUND

1. Field of the Disclosure

The present disclosure relates to a battery connecting and holding structure.

2. Description of Related Art

Portable electronic devices such as mobile phones and personal digital assistants (PDAs) are widely used. A battery having conductive connectors is generally installed in a receiving cavity of the portable electronic device. The conductive connector contacts exposed metallic elastic pins inside the receiving cavity.

The conductive connector typically contacts the elastic pins along a direction. An assembly space enclosed by the battery and the sidewall of the receiving cavity is often required for assembling the battery into the portable electronic device. However, the battery may be unstable within the receiving cavity due to the assembly space, which may interrupt the electrical connection between the elastic pins and the conductive connector.

Therefore, there is room for improvement within the art.

BRIEF DESCRIPTION OF THE DRAWINGS

Many aspects of the present battery connector and holding structure for battery can be better understood with reference to the following drawings. The components in the various drawings are not necessarily drawn to scale, the emphasis instead being placed upon clearly illustrating the principles of the present battery connector and holding structure for battery. Moreover, in the drawings, like reference numerals designate corresponding parts throughout the diagrams.

DETAILED DESCRIPTION OF THE EMBODIMENT

Figure 1:
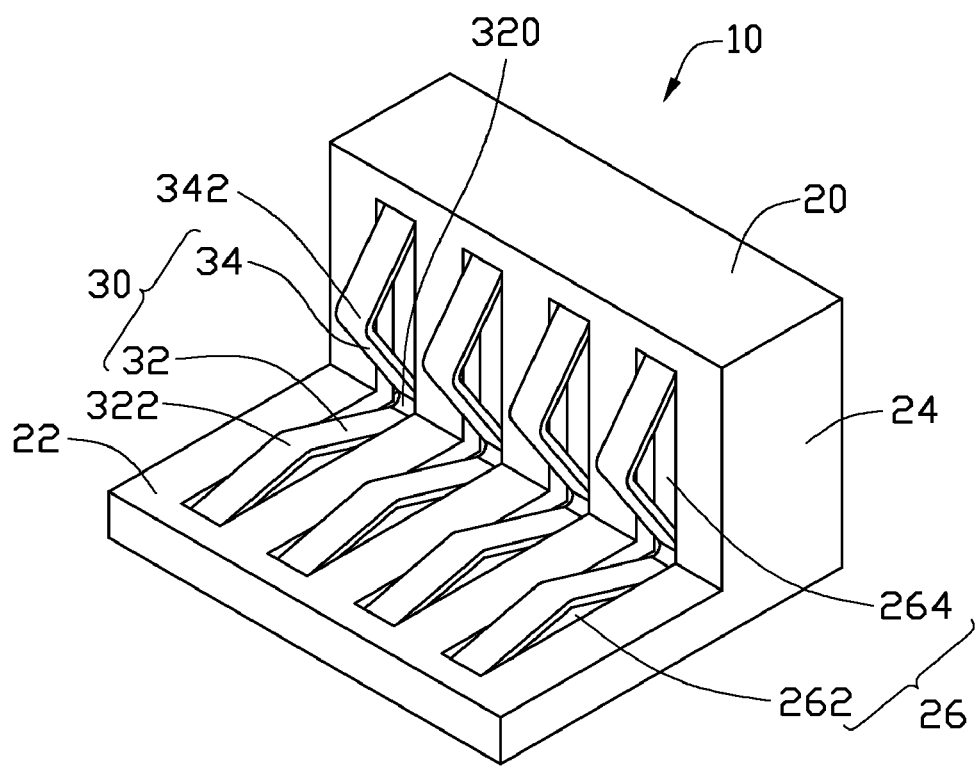
FIG. 1 is a structural schematic view of a battery connector, according to an exemplary embodiment.

FIG. 1 shows an exemplary battery connector 10 for mobile phones, and other portable electronic devices, such as personal digital assistants (PDAs), digital cameras, etc. The battery connector 10 includes a seat body 20 and a plurality of elastic pins 30 parallelly arranged in the seat body 20.

The seat body 20 is generally L-shaped and includes a first plate 22 and a second plate 24. The second plate 24 is perpendicularly formed on a side of the first plate 22. The seat body 20 defines a plurality of assembly grooves 26 for receiving the elastic pins 30. Each assembly groove 26 is generally L-shaped and includes a first groove section 262 and a second groove section 264 perpendicularly communicating the first groove section 262. The first groove section 262 is defined in the first plate 22 and the second groove section 264 is defined in the second plate 24.

The elastic pin 30 is generally W-shaped and includes a first folding portion 32 and a second folding portion 34. The second folding portion 34 connects to the first folding portion 32 and forms a V-shaped depression portion 320 at the connecting point. The first folding portion 32 has a first protuberance 322, and the second folding portion 34 has a second protuberance 342. The first and second protuberances 322 and 342 electronically connect to a battery. The first folding portion 32 can be received in the first groove section 262 and the protuberance 322 protrudes from the surface of the first plate 22. The second folding portion 34 can be received in the second groove section 264 and the protuberance 324 protrudes laterally from the surface of the second plate 24. The depression portion 320 contacts the intersection portion of the first folding portion 32 and the second folding portion 34.

Figure 2:
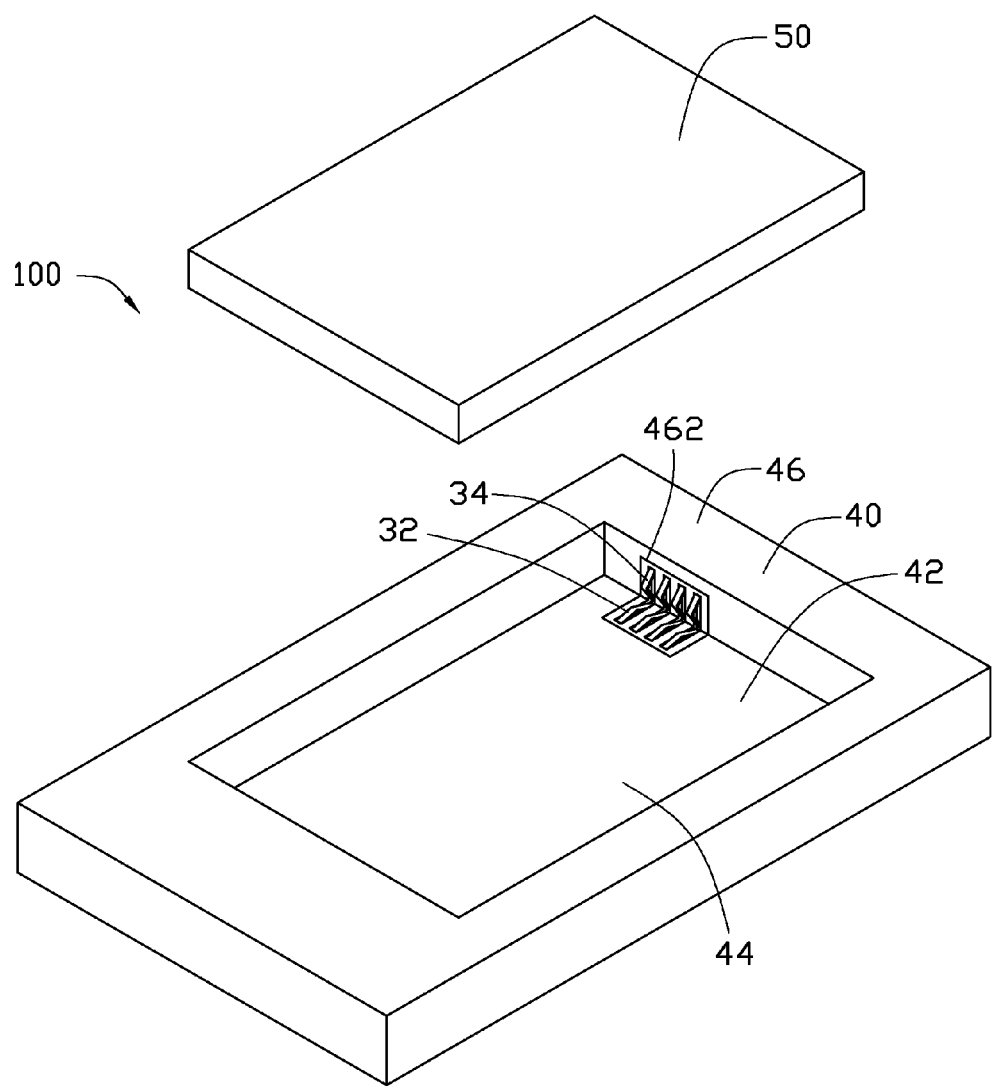
FIG. 2 is a disassembled schematic view of holding structure with the battery connector assembled shown in FIG. 1.

FIG. 2 shows the battery connector 10 assembled in a housing 40 of an electronic device. Accordingly, a holding structure 100 is provided for holding a battery 50. The housing 40 defines a receiving cavity 42 corresponding to the battery 50. The housing 40 includes a bottom wall 44 and a peripheral wall 46. The bottom wall 44 and the peripheral wall 46 cooperatively define an accommodating recess 462 to receive the battery connector 10. The accommodating recess 462 receives the battery connector 10. The protuberance 322 protrudes from the surface of the bottom wall 44, and the protuberance 324 protrudes laterally from the peripheral wall 46. It is to be understood that the elastic pins 30 electronically connect to internal circuitry of the electronic device.

Figure 3:
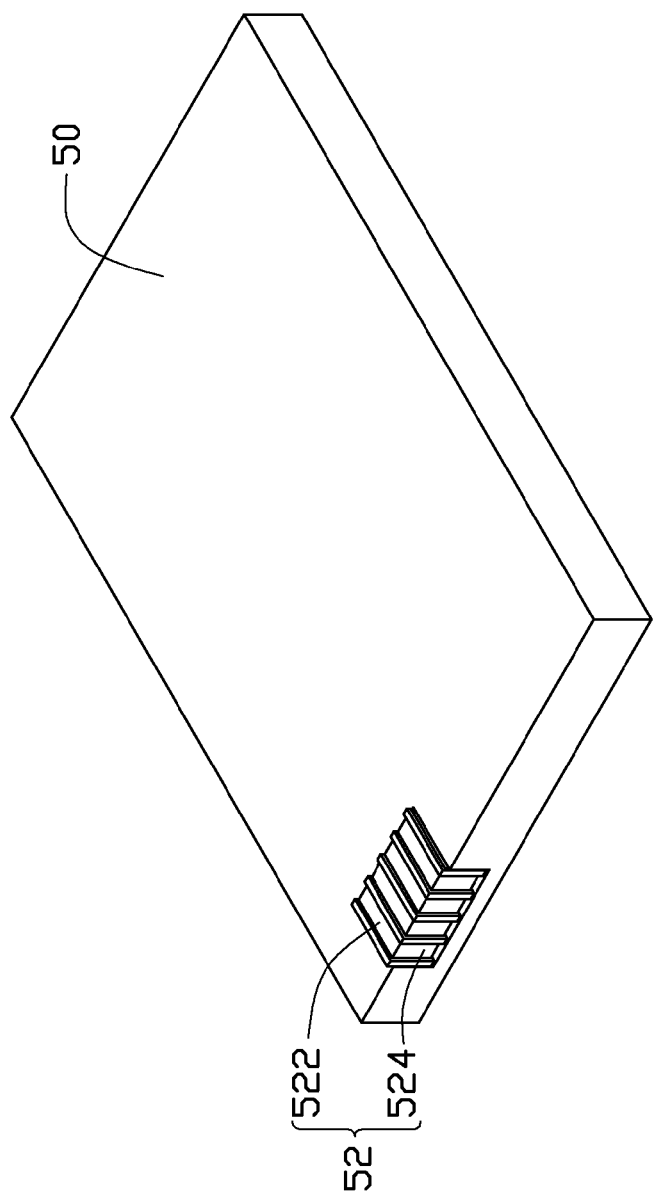
FIG. 3 is a structural schematic view of a battery, according to an exemplary embodiment.

Referring further to FIG. 3, the battery 50 has a plurality of conductive pins 52 arranged at the side. The conductive pins 52 electronically connect the elastic pins 30 of the battery connector 10, enabling the battery 50 electrically contact the battery connector 10. Each conductive pin 52 is generally L-shaped and includes a first connecting section 522 and a second connecting section 524 perpendicularly connecting to the first connecting section 524. The first connecting section 522 and the second connecting section 524 are respectively arranged on two adjacent surfaces of the battery 50. The first connecting section 522 contacts the first protuberance 322 of the elastic pin 30. The second connecting section 524 contacts the second protuberance 342 of the elastic pin 30.

Figure 4:
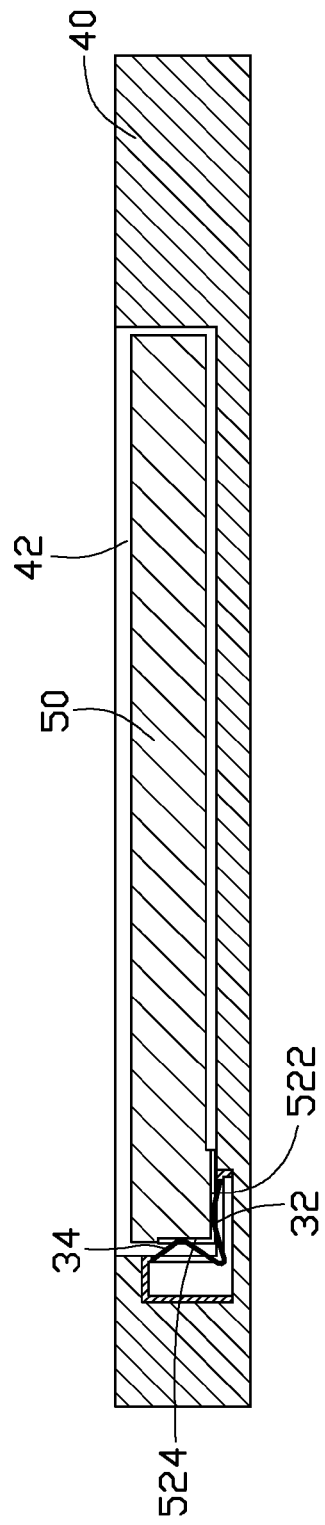
FIG. 4 is a sectional, assembled schematic view of holding structure shown in FIG. 2.

Referring to FIG. 4, the battery 50 is assembled in the receiving cavity 42 of the housing 40. The first connecting sections 522 contact the first protuberances 322 of the first folding portions 32 of the elastic pin 30. The second connecting sections 524 contact the second protuberances 342 of second folding portions 34 of the elastic pin 30. Due to the first connecting sections 522 contacting the first protuberances 322 and the second connecting sections 524 contacting the second protuberances 342, electrical contact between the battery 50 and the connector 10 cannot be easily interrupted.

It is to be understood that the battery connector 10 can be integrally formed with the housing 40 by injection molding.

It is to be understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A battery connector for connecting a battery to a portable electronic device, comprising:
    a seat body including a first plate and a second plate perpendicularly formed on a side of the first plate, the first plate and the second plate cooperatively defining a plurality of assembly grooves; and a plurality of elastic pins correspondingly assembled in the assembly grooves, each elastic pin including a first folding portion and a second folding portion connecting with the first folding portion;

wherein the elastic pins are correspondingly assembled in the assembly grooves, the first folding portions protrude from the first plate and the second folding portions protrude laterally from the second plate; and when the battery is connected to the portable electronic device through the battery connector, the first folding portions contact the battery along a first direction, and the second folding portions contact the battery along a second direction that is perpendicular to the first direction.

2. The battery connector as claimed in claim 1, wherein the assembly groove is generally L-shaped, it includes a first groove section defined in the first plate to assemble the first folding portion and a second groove section defined in the second plate to assemble the second folding portion, the second groove section perpendicularly communicates with the first groove section.

3. The battery connector as claimed in claim 1, wherein the first folding portion includes a first protuberance to contact a surface of a battery, the second folding portion includes a second protuberance to contact another surface of the battery.

4. A holding structure of a portable electronic device, comprising:
a housing having a bottom wall and a peripheral wall, the bottom wall and the peripheral wall cooperatively enclosing a receiving cavity,
a plurality of elastic pins assembled in the housing, each elastic pin including a first folding portion protruding from the bottom wall and a second folding portion protruding laterally from the peripheral wall;
a battery including a plurality of conductive pins corresponding to the elastic pins formed at an end thereof, each conductive piece including a first connecting section and a second connecting section perpendicularly connecting with the first connecting section,
wherein the battery is received in the receiving cavity, the first folding portion of each elastic pin contacts the first connecting section of a corresponding one of the conductive pins of the battery along a first direction and the second folding portion of each elastic pin contacts the second connecting section of a corresponding one of the conductive pins of the battery along a second direction that is perpendicular to the first direction.

5. The holding structure as claimed in claim 4, wherein the first connecting section is attached on a surface of the battery and the second connecting section is attached on another surface of the battery.

6. The holding structure as claimed in claim 4, wherein the elastic pins are formed on a battery connector assembled in the housing, the first folding portion of each elastic pin protrudes from the bottom wall and the second folding portion protrudes laterally from the peripheral wall.

7. The holding structure as claimed in claim 6, wherein the battery connector includes a seat body including a first plate and a second plate perpendicularly formed on a side of the first plate, the first plate and the second plate cooperatively defines a plurality of assembly grooves to assemble the elastic pins.

8. The holding structure as claimed in claim 7, wherein the assembly groove is generally L-shaped, it includes a first groove section defined in the first plate to assemble the first folding portion, and a second groove section defined in the second plate to assemble the second folding portion.

9. The holding structure as claimed in claim 4, wherein the first folding portion includes a first protuberance to contact first connecting section of the battery, the second folding portion includes a second protuberance to contact the second connecting section of the battery.

* * * * *